Swartz & Kreamer.
Harvester Rake.

No. 38,514.  Patented May. 12 1863.

Witnesses.  
P. E. Wilson  
E. Evans, Jr.

Daniel M. Swartz  
Jonathan Kreamer

By attorney.  
A. B. Stoughton.

UNITED STATES PATENT OFFICE.

DANIEL M. SWARTZ AND JONATHAN KREAMER, OF MILLHEIM, PA.

IMPROVEMENT IN HARVESTERS.

Specification forming part of Letters Patent No. 38,514, dated May 12, 1863.

*To all whom it may concern:*

Be it known that we, DANIEL M. SWARTZ and JONATHAN KREAMER, of Millheim, in the county of Centre and State of Pennsylvania, have invented certain new and useful Improvements in Rakes and Reels for Harvesting-Machines; and we do hereby declare the following to be a full, clear, and exact description of the same, reference being had to the accompanying drawings, making a part of this specification, in which—

Figure 2:
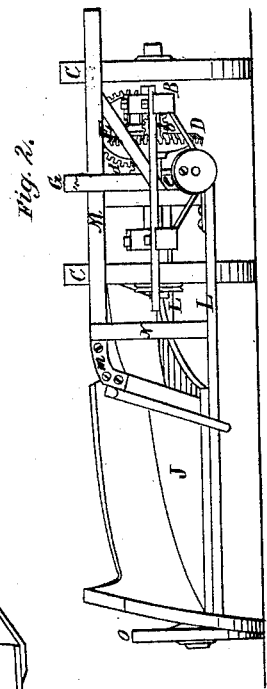
Figure 1:
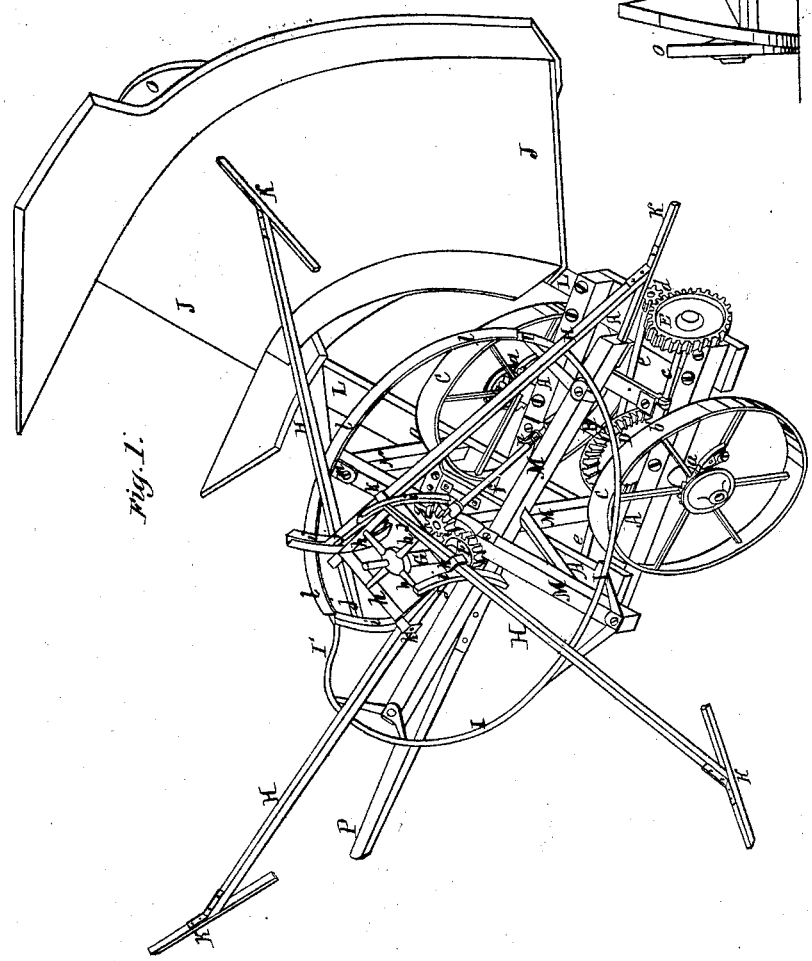

Figure 1 represents so much of a harvesting-machine, with our rake and reel upon it, as will illustrate our invention. Fig. 2 represents a front elevation of the machine with the rake and reel omitted, but showing how the latter is attached and driven.

Similar letters of reference, where they occur in the separate figures, denote like parts in both of them.

We are aware that horizontally-revolving rakes and reels controlled in their rising and falling movements have heretofore been used, both in rigid and yielding platforms; but our invention consists in the particular manner in which we construct, arrange, and operate such rakes and reels.

To enable others skilled in the art to make and use our invention, we will proceed to describe the same with reference to the drawings.

A represents the main frame of the harvesting-machine, supported on the axle B, upon which is placed the two driving and supporting wheels C C, said wheels being furnished with ratchet and pawl $a$ in the usual well-known manner and for the usual purpose. The axle B has upon it a beveled gear, D, which, through a beveled pinion, $b$, shaft $c$, gear E, pinion $d$, and shaft $e$, gives motion to the cutters. It also carries a small bevel-pinion that gears with a similar pinion on the lower end of the shaft $f$, by which motion is communicated to said shaft $f$. On the upper end of the shaft $f$ there is a bevel-pinion, $g$, that works in and turns a gear, F, on the vertical shaft G, as also the shaft itself. On top of the shaft G is placed a peculiarly-constructed frame, $h$, having at its four corners grooved arcs $i\ i\ i\ i$ for guiding and steadying the rear ends, $j\ j\ j\ j$, of the four rake and reel stales H, said stales being pivoted at points forward of their rear ends, as at $k$; and though we have shown four rakes and guides, yet we can use less or more than that number, if we so prefer to do. At about the center in length of the rake-stales H there are small hooks that take under the cam-ledge $l$ on the cam-guide I, which surrounds the rake and reel gear, to hold the rake and reel to its work when passing over the platform J; and the ends of the rake and reel stales or handles have arms K upon them, which serve as reel-arms to draw in the grain to the cutters, and some of these arms may have projecting from their lower sides teeth to act as rakes in sweeping the cut grain from the platform and deliver it in a gavel upon the ground. The cam-guide I, as shown by the drawings, holds up the rake or reel levers H sufficiently high to allow them to pass over the machine until they come to the point I', where they suddenly drop, and, their hooks taking under the cam-ledge $l$, they cannot rise until they have passed to the end of said ledge. By this arrangement, together with the arc-guides $i$, the rakes are rigidly held to their work when acting as rakes, as well as when acting as reels to draw in the grain to the cutters.

The platform J is hinged, by the coupling-bars L, to the main frame at or near the line of the crank-shaft $e$, that drives the cutters, so that the platform may rise and fall in conforming to the irregularities of the ground without cramping the pitman that vibrates the cutters. The frame M, that carries the reel and rake, the cam-guide I, and some of the reel and rake driving-gear, is also pivoted to the main frame at or by the same pivots that connect the platform to the main frame. Indeed, the reel and rake frame may be termed part and parcel of the platform-frame, as they are or may be rigidly united to each other at $m$ by an iron plate, and further by a brace or standard, N, so that the rake and reel and the platform will always move together.

That the rake and reel, which is driven from the main axle B on the main frame, may have the rising-and-falling motion that the platform has without cramping the gear, which is partly on each of the two frames, we arrange a toggle-joint at $n$, in which a long square shank on the shaft $f$ may freely play, and still work the gear without cramping or binding.

O is the outside supporting-wheel for the platform, and P the tongue by which the machine is guided by the team.

Having thus fully described the nature and objects of our improvements, what we claim therein as new, and desire to secure by Letters Patent, is—

In combination with a horizontally-revolving rake or reel that has also a rising-and-falling motion to accommodate itself to the platform and main frame, the frame $h$, with its guides $i$ for supporting and guiding the rear ends of the rake or reel stales or levers, substantially as and for the purpose described.

DANIEL M. SWARTZ.
JONATHAN KREAMER.

Witnesses:
A. B. STOUGHTON,
HAVER FENDRICH.